US011847821B2

(12) United States Patent
Chen et al.

(10) Patent No.: US 11,847,821 B2
(45) Date of Patent: Dec. 19, 2023

(54) FACE RECOGNITION NETWORK MODEL WITH FACE ALIGNMENT BASED ON KNOWLEDGE DISTILLATION

(71) Applicant: Realtek Semiconductor Corp., HsinChu (TW)

(72) Inventors: Chien-Hao Chen, HsinChu (TW); Shih-Tse Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 138 days.

(21) Appl. No.: 17/567,147

(22) Filed: Jan. 2, 2022

(65) Prior Publication Data

US 2023/0070321 A1 Mar. 9, 2023

(30) Foreign Application Priority Data

Sep. 3, 2021 (TW) .................................. 110132723

(51) Int. Cl.
*G06V 10/00* (2022.01)
*G06V 10/774* (2022.01)
*G06V 10/778* (2022.01)
*G06V 40/16* (2022.01)
*G06V 10/24* (2022.01)

(52) U.S. Cl.
CPC .......... *G06V 10/774* (2022.01); *G06V 10/242* (2022.01); *G06V 10/778* (2022.01); *G06V 40/161* (2022.01)

(58) Field of Classification Search
CPC .. G06V 10/774; G06V 10/242; G06V 10/778; G06V 40/161; G06V 10/7784; G06V 10/24; G06V 10/82; G06V 40/165
See application file for complete search history.

(56) References Cited

U.S. PATENT DOCUMENTS

| 11,526,697 | B1 * | 12/2022 | Tripathi | G06V 20/647 |
| 11,699,293 | B2 * | 7/2023 | Lemley | G06V 40/165 |
| | | | | 382/116 |
| 2019/0147224 | A1 * | 5/2019 | Li | G06T 15/205 |
| | | | | 382/103 |
| 2021/0158036 | A1 * | 5/2021 | Huber, Jr. | G06V 10/82 |

(Continued)

FOREIGN PATENT DOCUMENTS

| CN | 109886341 | B | 3/2021 |
| CN | 113239885 | A | 8/2021 |

OTHER PUBLICATIONS

Karlekar ,Deep Face Recognition Model Compression via Knowledge Transfer and Distillation ,Jun. 3, 2019.

(Continued)

*Primary Examiner* — Md K Talukder
(74) *Attorney, Agent, or Firm* — Winston Hsu

(57) ABSTRACT

A method for training a deep learning network for face recognition includes: utilizing a face landmark detector to perform face alignment processing on at least one captured image, thereby outputting at least one aligned image; inputting the at least one aligned image to a teacher model to obtain a first output vector; inputting the at least one captured image a student model corresponding to the teacher module to obtain a second output vector; and adjusting parameter settings of the student model according to the first output vector and the second output vector.

12 Claims, 5 Drawing Sheets

(56) References Cited

U.S. PATENT DOCUMENTS

| | | | |
|---|---|---|---|
| 2021/0398109 A1* | 12/2021 | Huber, Jr. | G06N 3/04 |
| 2022/0058332 A1* | 2/2022 | Ke | G06F 40/10 |
| 2023/0070321 A1* | 3/2023 | Chen | G06V 10/24 |

OTHER PUBLICATIONS

Wang, Knowledge Distillation and Student-Teacher Learning for Visual Intelligence: A Review and New Outlooks, Jun. 17, 2021.

\* cited by examiner

FACE RECOGNITION NETWORK MODEL WITH FACE ALIGNMENT BASED ON KNOWLEDGE DISTILLATION

BACKGROUND OF THE INVENTION

1. Field of the Invention

The present invention relates to deep learning, and more particularly to a method and related apparatus for training a face recognition network model with an inherent face alignment effect based on knowledge distillation techniques.

2. Description of the Prior Art

Facial recognition algorithms mainly perform identity recognition on facial images. In order to allow a deep learning network of facial recognition to use facial images on a common basis as possible, a facial landmark detector is usually added and placed before a facial recognition network model. The facial landmark detector is operable to perform face alignment in accordance with locations of key landmarks (such as, eyes, ears, noses) on faces. As shown in FIG. 1, a source image will be first provided to a face detector 10. The face detector 10 finds a face pattern from the source image and extracts it from the source image. Then, the extracted facial image is provided to the facial landmark detector 20. The facial landmark detector 20 performs face alignment on the facial image, which includes geometric processing such as translating, zooming in or out/scaling, or rotating in two-dimensional or three-dimensional space, on the facial image according to coordinates of key landmarks on the face. The image after the face alignment is provided to a face recognition network model 30. The purpose of face alignment is to avoid issues such as orientations, deformations or incorrect aspect ratios, which may negatively affect accuracy of the face recognition network model 30. However, to implement the facial landmark detector 20, it is necessary to configure computing resources from the system to support computations of the deep learning model on facial landmarks, calculations of angles required to rotate the facial images based on the coordinates of the facial landmarks, and rotations of the facial images according to the calculated rotation angles. For embedded platforms with relatively limited computing resources, using extra modules to implement face alignment will significantly reduce overall computing efficiency of the whole system.

SUMMARY OF THE INVENTION

In view of this, it is one object of the present invention to provide a training method for training a deep learning network model for face recognition. Through the training method provided by the present invention, the need for face alignment in the face recognition can be omitted. The present invention employs knowledge distillation technique to pre-trains a teacher model by using facial images that have been processed by face alignment procedure. Accordingly, a student model is trained based on the trained teacher model and facial images that have not been processed by face alignment procedure. Because the facial images that have not been processed by the face alignment procedure are used for training the student model, the adaptability of the student model to facial images with orientations (non-upright) or wrong aspect ratios is improved. Later, when the student model is used, its can provide accurate face recognition without the facial landmark detector that is necessary in the conventional art.

According to one embodiment, a method for training a deep learning network for face recognition is provided. The method comprises: utilizing a facial landmark detector to perform face alignment procedure on at least one extracted image, thereby to output at least one aligned image; inputting the at least one aligned image to a teacher model to obtain a first output vector; inputting the at least one extracted image to a student model that corresponds to the teacher module to obtain a second output vector; and adjusting parameter settings of the student model according to the first output vector and the second output vector.

According to one embodiment, an apparatus for training a deep learning network for face recognition is provided. The apparatus comprises: a storage unit configured to store program codes and a processing unit configured to execute the program codes The processing unit is operable to perform following operations when executing the program codes: performing face alignment procedure on at least one extracted image, thereby to output at least one aligned image; inputting the at least one aligned image to a teacher model to obtain a first output vector; inputting the at least one extracted image to a student model that corresponds to the teacher module to obtain a second output vector; and adjusting parameter settings of the student model according to the first output vector and the second output vector.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
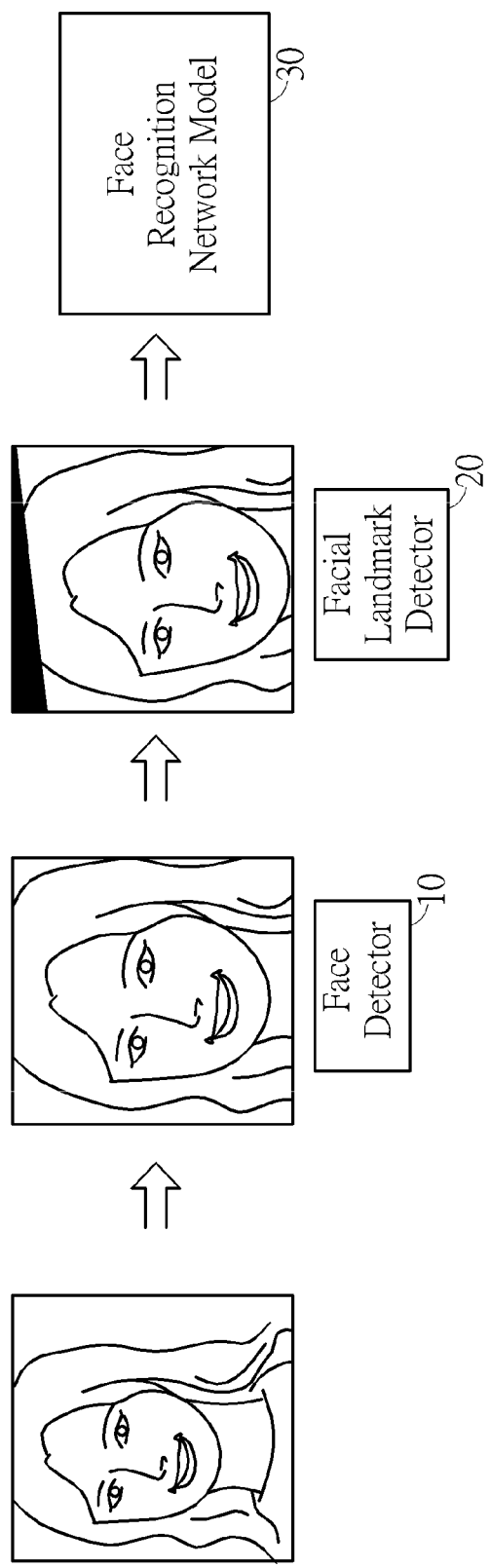
FIG. 1 illustrates simplified architecture of a conventional deep learning network for facial recognition.
Figure 2:
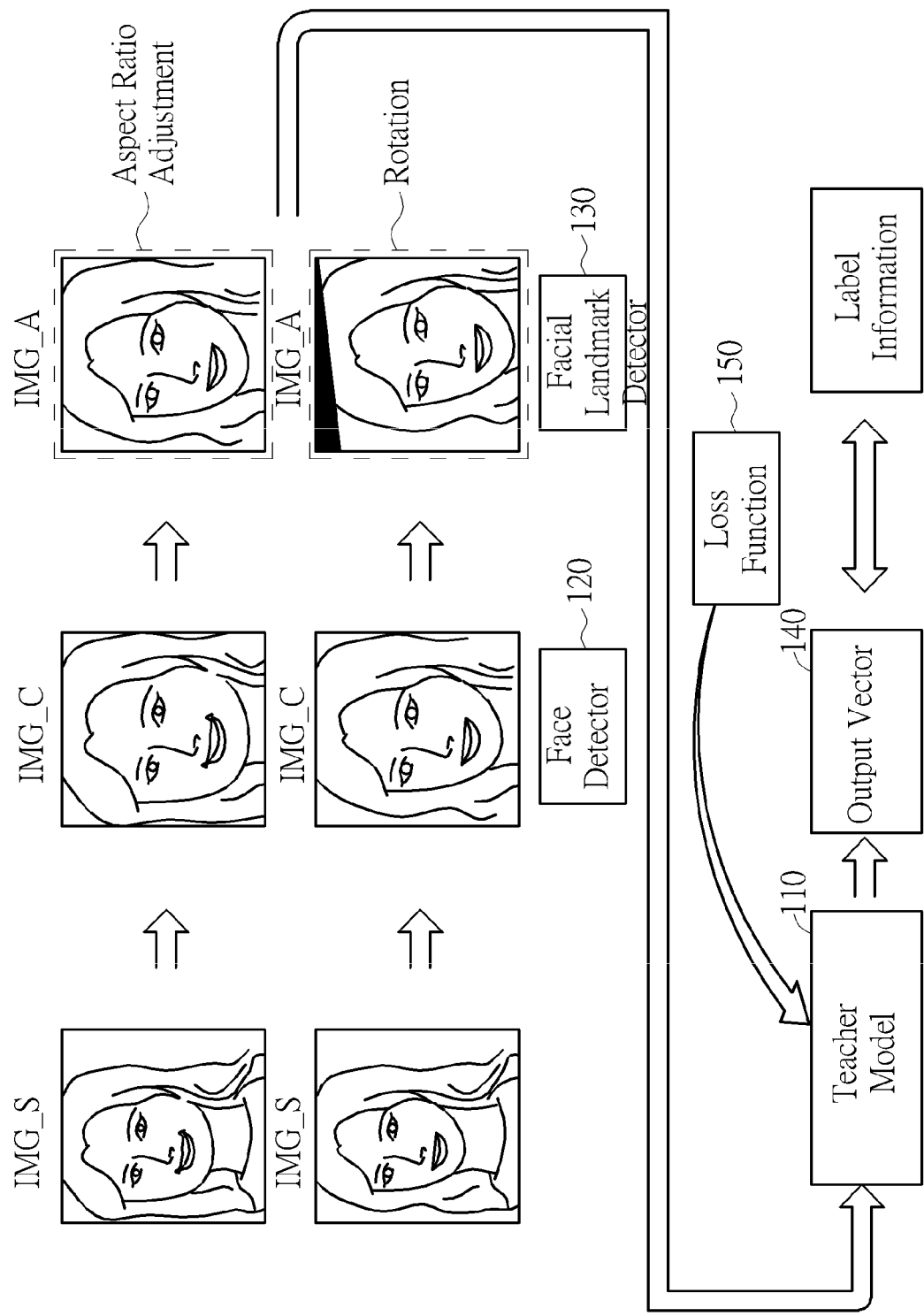
FIG. 2 illustrates how to train a teacher model using images processed by face alignment procedure according to one embodiment of the present invention.
Figure 3:
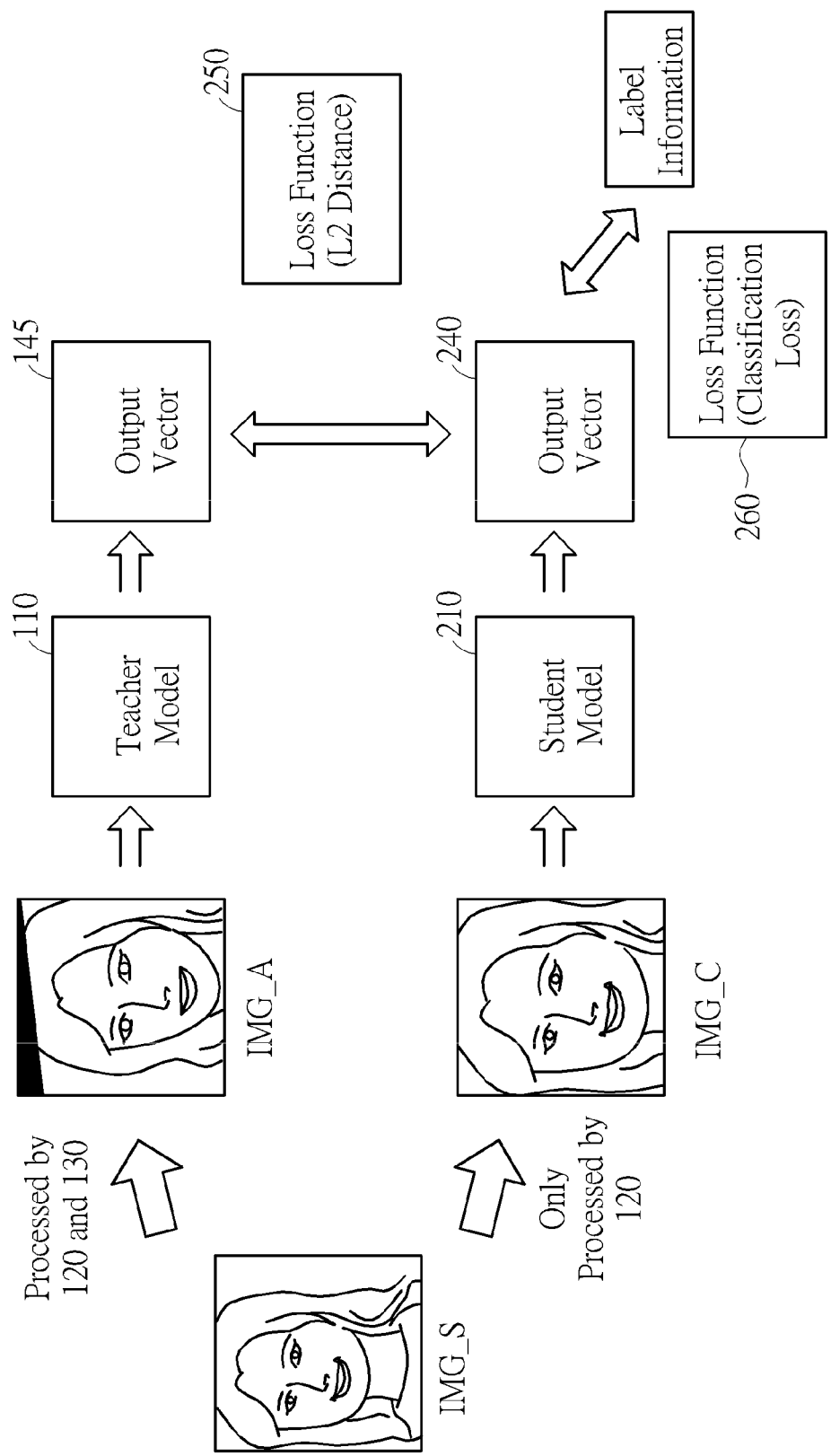
FIG. 3 illustrates how to use a trained teacher model and images without being processed by face alignment procedure to train a student model according to one embodiment of the present invention.

Please refer to FIG. 2 in conjunction with FIG. 3, which illustrate how to train a deep learning network for face recognition based on knowledge distillation technique in an embodiment of the present invention. The deep learning network for face recognition trained by the present invention can be used to implement identity recognition. It can generate a one-dimensional output vector based on an input facial image. The output vector will be then compared with all registered vectors in a database. Once an L2 distance between the output vector and a registered vector in the database is lower than a predetermined threshold, it can be determined that the input facial image matches an identity that is associated with the registered vector.

As shown by FIG. 2, a teacher model 110 will be firstly trained in the embodiment of the present invention. During the training process, one or more source images IMG_S will be inputted to a face detector 120, and the face detector 120 will find a part containing human facial features from the source image IMG_S and extract it. Accordingly, an extracted image IMG_C is provided to a facial landmark detector 130. The facial landmark detector 130 identifies locations of key landmarks (such as eyes, ears, noses) on the face in the extracted image IMG_C, and selectively performs face alignment. For example, when the face pattern in the extracted image IMG_C with orientation (non-upright) or incorrect aspect ratio, the facial landmark detector 130 will translate, zoom/scale, or rotate the captured image IMG_C in two-dimensional or three-dimensional space. Then, the facial landmark detector 130 provides an image IMG_A that has been processed by the face alignment procedure to the teacher model 110. After the image IMG_A is inputted to the teacher model 110, the teacher model 110 generates an output vector 140. The output vector 140 is compared with label information corresponding to the source image IMG_S (i.e., identity information to which the source image IMG_S substantially corresponds) to generate a loss function 150 (i.e., identification loss). Parameter settings of the teacher model 110 will be adjusted according to the current loss function 150, so as to achieve the training of the teacher model 110. After a large number of different source images IMG_S are used to train the teacher model 110, and the loss function 150 becomes lower than a predetermined value, the training of the teacher model 110 is completed. Based on the knowledge distillation technique, a simplified student model 210 is distilled from the trained teacher model 110. Compared with the teacher model 110, the student model 210 has a simpler structure and lower computational complexity, and uses a lower part of overall computational resources of the system. Since the student model 210 is distilled from the teacher model teacher 110, its recognition accuracy is close to the teacher model 110.

Please refer to FIG. 3, which illustrates how to train a student model in accordance with one embodiment of the present invention. Specifically, the face detector 120 extracts a facial image from one or more source images IMG_S, thereby to output an extracted image IMG_C. The extracted image IMG_C will be directly inputted to the student model 210 without being processed by the face alignment procedure. The student model 210 generates an output vector 240 based on the inputted extracted image IMG_C. At the same time, the extracted image IMG_C is also processed by the face alignment procedure through the facial landmark detector 130 to generate an aligned image IMG_A. The aligned image IMG_A will be inputted to the teacher model 110 to generate a corresponding output vector 145. Based on differences between the output vector 145 and the output vector 240 (e.g. L2 distance), a corresponding loss function 250 can be obtained. According to the loss function 250, parameter settings of the student model 210 can be adjusted. On the other hand, the output vector 240 is also compared with label information associated with the one or more source images IMG_S. Based on differences between the output vector 240 and the label information (e.g. classification loss), another loss function 260 will be obtained. According to the loss function 260, the parameter settings of the student model 210 can also be adjusted. Through the loss functions 250 and 260, the student model 210 is trained. After many different source images IMG_S are employed to train the student model 210, and the loss functions 250 and 260 become be lower than respective predetermined values, the training of the student model 210 is completed. Please note that during the process of training the student model 210, the teacher model 110 is configured as inference-only, and its parameter settings will not be adjusted at this moment.

Figure 4:
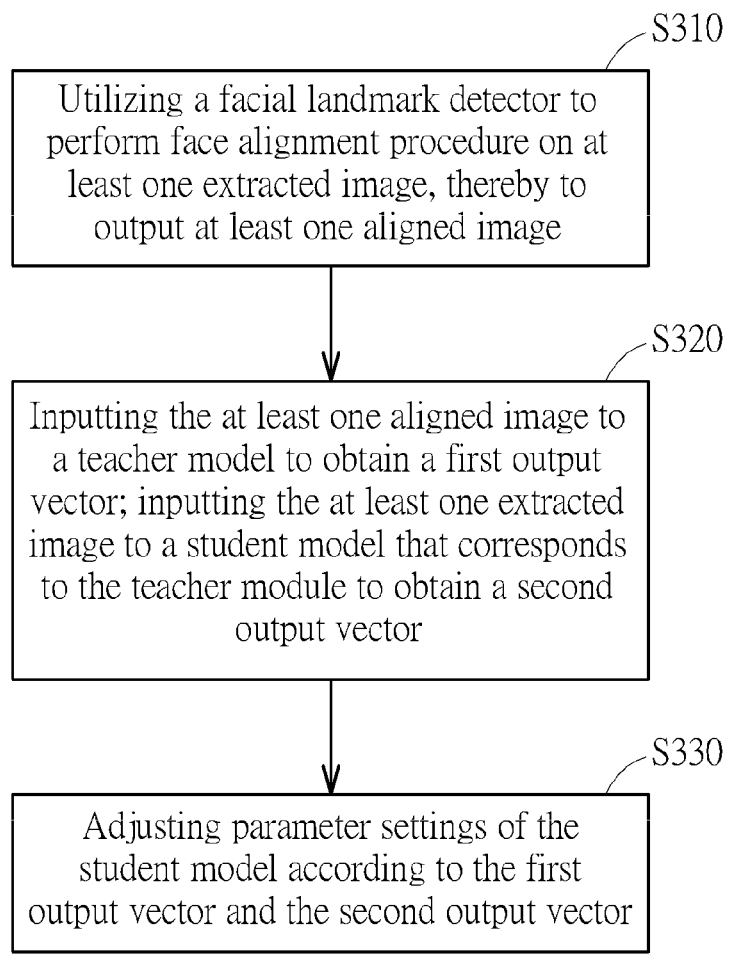
FIG. 4 illustrates a method of training a deep learning network for facial recognition according to one embodiment of the present invention.

FIG. 4 illustrates a method of training a deep learning network for facial recognition according to an embodiment of the present invention. As shown in the figure, the training method provided by the present invention includes the following simplified flow:

S310: utilizing a facial landmark detector to perform face alignment procedure on at least one extracted image, thereby to output at least one aligned image;

S320: inputting the at least one aligned image to a teacher model to obtain a first output vector; inputting the at least one extracted image to a student model that corresponds to the teacher module to obtain a second output vector; and S330: adjusting parameter settings of the student model according to the first output vector and the second output vector.

Figure 5:
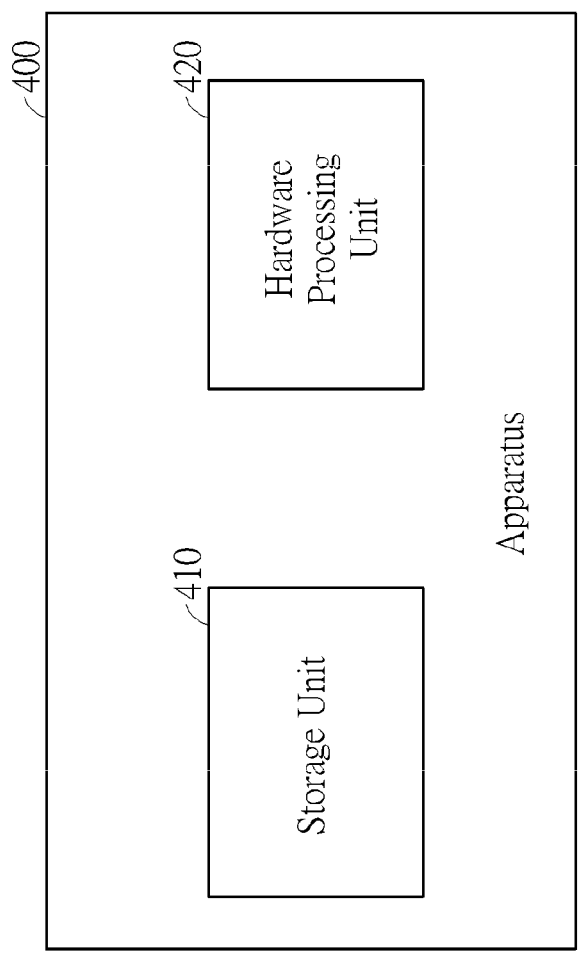
FIG. 5 illustrates an apparatus for training a deep learning network for facial recognition according to one embodiment of the present invention.

As principles and specific details regarding the foregoing steps have been described in detail with the above embodiments, descriptions and explanations will not be repeated here. It should be noted that the above flow may be possible by adding other additional steps or making appropriate changes and adjustments to better realize the training of the face recognition network model and further improve its recognition accuracy. Furthermore, all the operations in the foregoing embodiments of the present invention can be implemented through an apparatus 400 shown in FIG. 5. As illustrated, a storage unit 410 in the apparatus 400 can be used to store program codes, instructions, variables, or data. A hardware processing unit 420 in the apparatus 400 can execute the program codes and instructions stored in the storage unit 410, and refer to the stored variables or data to perform all the operations in the foregoing embodiments.

In conclusion, the present invention provides a method for training a deep learning network model for face recognition. Through the training method provided by the present invention, the face alignment procedure in the face recognition algorithm can be omitted. Specifically, the present invention uses facial images that have processed by the facial alignment procedure to pre-train a teacher model. Then, a student model is trained by using the teacher model that has been trained as well as facial images that has not been processed by the facial alignment procedure. Because the facial images without being processed by the face alignment procedure are employed for training the student model, the adaptability of the student model to facial images with orientations (non-upright) or wrong aspect ratios is improved. When the student model performs face recognition, it still has a decent recognition event it does not include the facial landmark detector that is necessary in the conventional art. In this way, the facial recognition network model effectively reduces the need of system computing resources.

Embodiments in accordance with the present invention can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for training a deep learning network for face recognition, comprising:
    utilizing a facial landmark detector to perform face alignment procedure on at least one extracted image, thereby to output at least one aligned image;
    inputting the at least one aligned image to a teacher model to obtain a first output vector;
    inputting the at least one extracted image to a student model that corresponds to the teacher module to obtain a second output vector;
    adjusting parameter settings of the student model according to the first output vector and the second output vector;
    utilizing the facial landmark detector to perform the face alignment procedure on a plurality of extracted images, thereby to output a plurality of aligned images;
    inputting the plurality of aligned images to the teacher model to obtain a plurality of third output vectors;
    respectively calculating a first loss function between the plurality of third output vectors and label information associated with the plurality of extracted images; and
    adjusting parameter settings of the teacher model according to the first loss function.

2. The method of claim 1, wherein the step of performing the face alignment procedure on the at least one extracted image comprises:
    performing translation, zooming/scaling or rotation in two-dimensional/three-dimensional space processing on the at least one extracted image to obtain the at least one aligned image.

3. The method of claim 1, further comprising:
    utilizing a face detector to extract the at least one extracted image from a source image.

4. The method of claim 1, wherein the step of inputting the at least one aligned image to the teacher model to obtain the first output vector comprises:
    inputting the at least one aligned image to the teacher model that has been adjusted according to the first loss function, thereby to obtain the first output vector.

5. The method of claim 1, wherein the step of adjusting the parameter settings of the student model comprises:
    calculating a second loss function between the first output vector and the second output vector; and
    adjusting the parameter settings of the student model according to the second loss function.

6. The method of claim 1, further comprising:
    calculating a third loss function between the second output vector and label information associated with the at least one extracted image; and
    adjusting the parameter settings of the student model according to the third loss function.

7. An apparatus for training a deep learning network for face recognition, comprising
    a storage unit, configured to store program codes;
    a processing unit, configured to execute the program codes such that the processing unit is operable to perform following operations:
    performing face alignment procedure on at least one extracted image, thereby to output at least one aligned image;
    inputting the at least one aligned image to a teacher model to obtain a first output vector;
    inputting the at least one extracted image to a student model that corresponds to the teacher module to obtain a second output vector; and
    adjusting parameter settings of the student model according to the first output vector and the second output vector; and the processing unit is further configured to execute the store program codes such that the processing unit is operable to:
    perform the face alignment procedure on a plurality of extracted images, thereby to output a plurality of aligned images;
    input the plurality of aligned images to the teacher model to obtain a plurality of third output vectors;
    respectively calculate a first loss function between the plurality of third output vectors and label information associated with the plurality of extracted images; and adjust parameter settings of the teacher model according to the first loss function.

8. The apparatus of claim 7, wherein the processing unit is configured to execute the program codes such that the processing unit is operable to:

perform translation, zooming/scaling or rotation in two-dimensional/three-dimensional space processing on the at least one extracted image to obtain the at least one aligned image.

9. The apparatus of claim 7, wherein the processing unit is configured to execute the store program codes such that the processing unit is operable to:

extract the at least one extracted image from a source image.

10. The apparatus of claim 7, wherein the processing unit is configured to execute the store program codes such that the processing unit is operable to:

input the at least one aligned image to the teacher model that has been adjusted according to the first loss function, thereby to obtain the first output vector.

11. The apparatus of claim 7, wherein the processing unit is configured to execute the store program codes such that the processing unit is operable to:

calculate a second loss function between the first output vector and the second output vector; and adjust the parameter settings of the student model according to the second loss function.

12. The apparatus of claim 7, wherein the processing unit is configured to execute the store program codes such that the processing unit is operable to:

calculate a third loss function between the second output vector and label information associated with the at least one extracted image; and adjust the parameter settings of the student model according to the third loss function.

* * * * *